United States Patent
Ke et al.

(10) Patent No.: US 10,948,978 B2
(45) Date of Patent: Mar. 16, 2021

(54) VIRTUAL OBJECT OPERATING SYSTEM AND VIRTUAL OBJECT OPERATING METHOD

(71) Applicant: XRSPACE CO., LTD., Taoyuan (TW)

(72) Inventors: Shih-Hao Ke, New Taipei (TW); Wei-Chi Yen, Taipei (TW); Chih-Wen Wang, New Taipei (TW); Ming-Ta Chou, Taipei (TW)

(73) Assignee: XRSPACE CO., LTD., Taoyuan (TW)

( * ) Notice: Subject to any disclaimer, the term of this patent is extended or adjusted under 35 U.S.C. 154(b) by 0 days.

(21) Appl. No.: 16/662,045

(22) Filed: Oct. 24, 2019

(65) Prior Publication Data

US 2020/0341539 A1 Oct. 29, 2020

Related U.S. Application Data

(63) Continuation-in-part of application No. 16/392,615, filed on Apr. 23, 2019.

(51) Int. Cl.
G06F 3/01 (2006.01)
G06F 3/0346 (2013.01)
G06K 9/78 (2006.01)
G06T 7/20 (2017.01)

(52) U.S. Cl.
CPC .......... G06F 3/011 (2013.01); G06F 3/0346 (2013.01); G06K 9/78 (2013.01); G06T 7/20 (2013.01); *G06T 2207/30196* (2013.01)

(58) Field of Classification Search
CPC ......... G06F 3/011; G06F 3/0346; G06K 9/78; G06T 7/20; G06T 2207/30196
See application file for complete search history.

(56) References Cited

U.S. PATENT DOCUMENTS

| | | | |
|---|---|---|---|
| 2012/0113223 A1* | 5/2012 | Hilliges | G06F 3/00 348/46 |
| 2013/0095924 A1 | 4/2013 | Geisner et al. | |
| 2013/0286004 A1 | 10/2013 | McCulloch et al. | |
| 2014/0104274 A1* | 4/2014 | Hilliges | G06F 30/20 345/424 |
| 2016/0342207 A1 | 11/2016 | Beran | |
| 2016/0364912 A1 | 12/2016 | Cho et al. | |

FOREIGN PATENT DOCUMENTS

| | | |
|---|---|---|
| CN | 107861682 | 3/2018 |
| CN | 108958475 | 12/2018 |
| CN | 109144256 | 1/2019 |
| TW | I468734 | 1/2015 |

OTHER PUBLICATIONS

"Search Report of Europe Counterpart Application", dated Mar. 18, 2020, p. 1-p. 7.

* cited by examiner

*Primary Examiner* — Michael Pervan
(74) *Attorney, Agent, or Firm* — JCIP Global Inc.

(57) ABSTRACT

A virtual object operating system and a virtual object operating method are provided. The virtual object operating method includes the following steps. Multiple images are obtained. A motion of an operating object in the images is determined. The operating object is existed in a real environment. A motion of a virtual object interacted with the operating object according to the motion of the operating object is determined. The virtual object is existed in a virtual environment. Accordingly, the motion of the operating object can be tracked without motion sensor on operating body portion of a user.

28 Claims, 4 Drawing Sheets

VIRTUAL OBJECT OPERATING SYSTEM AND VIRTUAL OBJECT OPERATING METHOD

CROSS-REFERENCE TO RELATED APPLICATION

This application is a continuation-in-part application of and claims the priority benefit of U.S. application Ser. No. 16/392,615, filed on Apr. 23, 2019. The entirety of the above-mentioned patent application is hereby incorporated by reference herein and made a part of this specification.

BACKGROUND OF THE DISCLOSURE

1. Field of the Disclosure

The present disclosure generally relates to a simulation in virtual world, in particular, to a virtual object operating system and a virtual object operating method.

2. Description of Related Art

Technologies for simulating senses, perception and/or environment, such as virtual reality (VR), augmented reality (AR), mixed reality (MR) and extended reality (XR), are popular nowadays. The aforementioned technologies can be applied in multiple fields, such as gaming, military training, healthcare, remote working, etc.

In order to let a user perceive the simulated environment as a real environment, the motion of the user in the real world would be tracked, so that the displaying image and the motion of an avatar on a VR, AR, MR or XR display can be changed in response to the motion of the user. In addition, the avatar may interact with a virtual object in the simulated environment. Because the simulated environment is generated by creators, the creators can configure an interacting situation between the avatar and the virtual object. Therefore, how to define the interacting situation would be important for a virtual world simulation.

SUMMARY OF THE DISCLOSURE

Accordingly, the present disclosure is directed to a virtual object operating system and a virtual object operating method, to simulate behavior of a virtual object in a virtual environment.

In one of the exemplary embodiments, a virtual object operating method includes the following steps. Multiple images are obtained from a real environment. A motion of an operating object is determined according to the images. The operating object is existed in a real environment. A motion of a virtual object interacted with the operating object is determined according to a determining factor. The virtual object is existed in a virtual environment. The determining factor includes the motion of the operating object.

In one of the exemplary embodiments, a virtual object operating system includes an image capturing apparatus and a processor. The image apparatus is used to obtain multiple images from a real environment. The processor is coupled to the image capturing apparatus. The processor is configured to determine a motion of an operating objection according to the images, and determine a motion of a virtual object interacted with the operating object according to a determining factor. The determining factor includes the motion of the operating object, and the virtual object is existed in a virtual environment.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
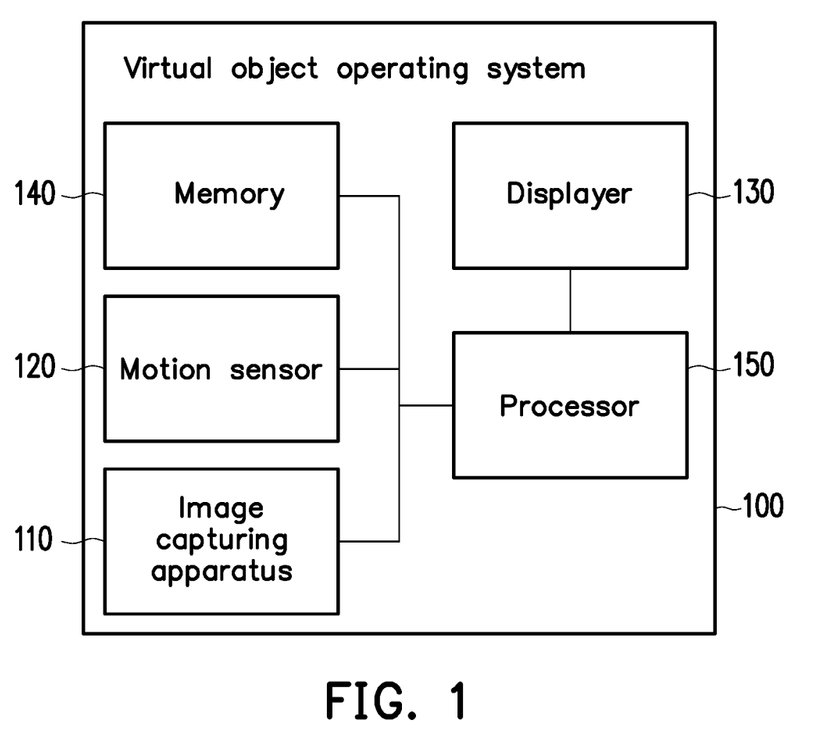
FIG. 1 is a block diagram illustrating a virtual object operating system according to one of the exemplary embodiments of the disclosure.

FIG. 1 is a block diagram illustrating a virtual object operating system 100 according to one of the exemplary embodiments of the disclosure. Referring to FIG. 1, the virtual object operating system 100 includes, but not limited to, one or more image capturing apparatuses 110, a display 130, a memory 140, and a processor 150. The virtual object operating system 100 is adapted for VR, AR, MR, XR or other reality related technology.

The image capturing apparatus 110 may be a camera, a video recorder, or other image sensors capable of images. The image capturing apparatus 110 may be placed at a position where the image capturing apparatus 110 can capture a user or body portion of the user. For example, when a user wears a head mounted display (i.e., one implementing embodiment of the virtual object operating system 100), the image capturing apparatus 110 may be placed at the position in front of eyes of the user and capture toward hands and/or legs of the user. For another example, one or more image capturing apparatuses 110 are placed at floor, wall or ceiling, and the image capturing apparatuses 110 capture toward the user.

In some embodiments, the virtual object operating system 100 may further include one or more motion sensors 120. The motion sensor 120 may be an accelerometer, a gyroscope, a magnetometer, a laser sensor, an inertial measurement unit (IMU), an infrared ray (IR) sensor, or any combination of aforementioned sensors. In the embodiment of the disclosure, the motion sensor 120 is used for sensing the motion of body portion(s) of a user, to generate corresponding sensing data (such as 3-degree of freedom (DoF)/6-DoF information). The body portion may be a hand, a head, an ankle, a leg, a waist, or other portions. It should be noticed that, the motion sensor 120 could be embedded in a handheld controller or a wearable apparatus, such as smart watch, ankle sensor, or the likes.

The display 130 may be a liquid-crystal display (LCD), a light-emitting diode (LED) display, an organic light-emitting diode (OLED) display, or other displays. In the embodiment of the disclosure, the display 130 is used for displaying images. It should be noted that, in some embodiments, the display 130 may be a display of an external apparatus (such as a smart phone, a tablet, or the likes), and the external apparatus can be placed on the main body of a head mounted display.

The memory 140 may be any type of a fixed or movable Random Access Memory (RAM), a Read-Only Memory (ROM), a flash memory, a similar device or a combination of the above devices. In some embodiments, the memory 140 records program codes, device configurations, buffer data or permanent data (such as images, virtual environment, determining factor, detected result, etc.), and these data would be introduced later.

The processor 150 is coupled to the image capturing apparatus 110, the motion sensor 120, the display 130 and the memory 140. The processor 150 is configured to load the program codes stored in the memory 140, to perform a procedure of the exemplary embodiment of the disclosure. In some embodiments, functions of the processor 150 may be implemented by using a programmable unit such as a central processing unit (CPU), a microprocessor, a microcontroller, a digital signal processing (DSP) chip, a field programmable gate array (FPGA), etc. In some embodiments, the functions of the processor 150 may also be implemented by an independent electronic device or an integrated circuit (IC), and operations of the processor 150 may also be implemented by software.

It should be noted that, the processor 150 may not be disposed at the same apparatus with the image capturing apparatus 110, the motion sensor 120 or the display 130. However, the apparatuses respectively equipped with these elements or apparatuses may further include communication transceivers with compatible communication technology, such as Bluetooth, Wi-Fi, IR, or physical transmission line, to transmit/receive data with each other.

To better understand the operating process provided in one or more embodiments of the disclosure, several embodiments will be exemplified below to elaborate the operating process of the virtual object operating system 100. The devices and modules in the virtual object operating system 100 are applied in the following embodiments to explain the virtual object operating method provided herein. Each step of the method can be adjusted according to actual implementation situations and should not be limited to what is described herein.

Figure 2:
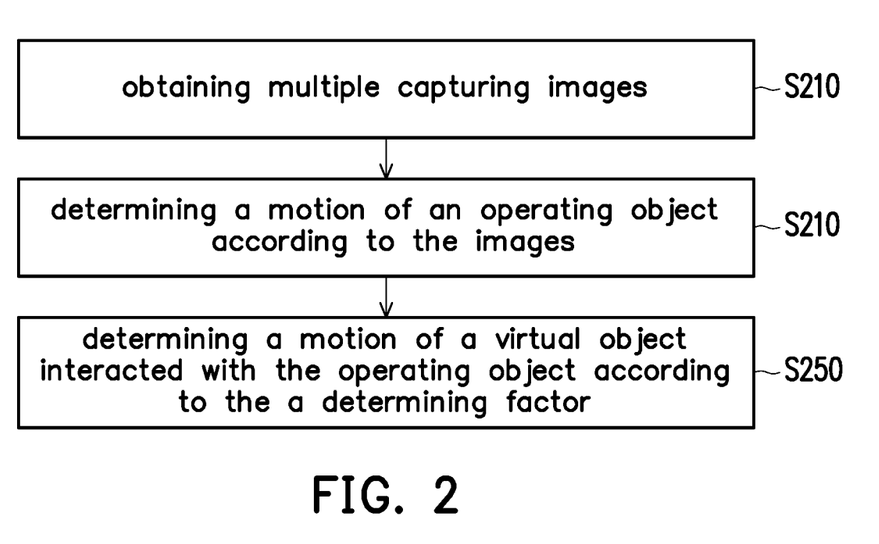
FIG. 2 is a flowchart illustrating a virtual object operating method according to one of the exemplary embodiments of the disclosure.

FIG. 2 is a flowchart illustrating a virtual object operating method according to one of the exemplary embodiments of the disclosure. Referring to FIG. 2, the image capturing apparatus 110 capture toward one or more operating objects to obtain multiple images from a real environment (step S210). Specifically, the operating object could be a hand, a leg, foot, an ankle, a leg, a waist or other body portion of a user in the real environment. The operating object also could be a handheld controller, a wearable device, or any physical object in the real environment. The definition of the operating object is variable based on the actual requirements. Then, the images may be stored in the memory 140 and be accessed by the processor 150 later.

Then, the processor 150 determines a motion of the operating object according to the images (step S230). Specifically, the processor 150 extracts features (such as color, texture, geometric shape, etc.) in the images to identify the operating object in the images. The processor 150 may create a virtual operating object in a virtual environment corresponding to the identified operating object in the real environment. For example, a hand is identified in an image, and a virtual hand of an avatar would be created. The processor 150 can further display the virtual operating object in the virtual environment on the display 130. Then, the processor 150 estimates the motion of the operating object in the real environment based on an analyzed result of the images.

In one embodiment, the processor 150 selects a starting image among the images, and the starting image captures an initial state of an interacting situation between the operating object and a virtual object. The virtual object could be any object in the virtual environment. For example, the virtual object is a virtual baseball, a virtual basketball, a virtual golf club, an avatar, etc. The interacting situation may be contact between the virtual object and the virtual operating object. For example, a stem portion of a virtual goblet is touched by a hand of an avatar. The interacting situation may also be a selection or a locking behavior on the virtual object. For example, a top cover of a virtual laptop is selected by a selection operation (such as pressing a physical/virtual button, etc.) on a handheld controller. For another example, a specific gesture of a hand of an avatar (such as hold, handshake gesture, etc.) is identified in an image, and the specific gesture intends to interact with a virtual gun. For one more example, a virtual ball is locked as a target according to an eye gaze of a user. It should be noted that, the interacting situation could be any other situations that the operating object is interacted with the virtual object, and the embodiment is not limited thereto.

In response to the interacting situation meeting a trigger condition, one of images, which captures the initial state of the interacting situation, would be determined as the starting image. The trigger condition may be that a contact exists between the virtual object and the virtual operating object, or the contact is released. The trigger condition may be that a selection or a lock behavior on the virtual object is detected. The trigger condition may also be that a specific gesture is detected, the velocity of the operating object is less than a threshold, a specific scenario is detected, etc. The initial state is the state when the interacting situation just happens.

Then, the processor 150 selects an ending image among the images, and the ending image captures a final state of the interacting situation between the operating object and a virtual object. The images would be arranged in order according to their captured time points. Compared with the initial state, the final state is the state when the interacting situation corresponding to the initial just ends. For example, the initial state is the situation that the right hand of the user touches a virtual ball, and the final state is the situation that the virtual ball is thrown out by the right hand. In some embodiments, the final state may be the predefined state. For example, the predefined state may be a specific pose of the user, a specific gesture of the user, etc.

Then, the processor 150 may determine the motion of the operating object by comparing the starting image and the ending image. If the operating object moves, positions of the operating object in different images at different captured time points may be different. In one embodiment, the compared result between the starting image and the ending image is a position change, and the motion of the operating object includes a velocity of the operating object. In some embodiments, the processor 150 may calculate an elapsed time and a position change of the operating object between the starting image and the ending image. The processor 150 may compare the positions of the operating object between the starting image and the ending image, and a displacement or a trajectory (referred as position change route later) of the operating object from the starting image and the ending image would be determined as the position change. The position change route is formed by connecting a representative point/block of the operating object in the starting image and the ending image. In addition, the image capturing apparatus 110 may be configured with a frame rate, which is the number of times the image capturing apparatus 110 captures an image, such as 30, 60, or 120 frames per second (fps). Each captured image is stored with its captured time. The processor 150 may determine the time difference between the captured times of the starting image and the ending image as the elapsed time.

Then, the processor 150 may obtain an average velocity of the operating object according to the elapsed time and the position change of the operating object between the starting image and the ending image. The position change may include a relative distance and a relative direction (corresponding to an angle relative to a reference line). The relative distance is the distance between the two positions of the operating object in the two images. The relative direction is the direction that the position of the operating object in one image faces toward the position of the operating object in another image. The velocity of the operating object then can be determined according to the calculated result that the relative distance of the position change is divided by the elapsed time. In addition, the direction of the velocity would be determined according to the relative direction of the position change between two images. Then, the processor 150 may use the average velocity of the operating object as a reference to determine the motion of the operating object.

Figure 3A:
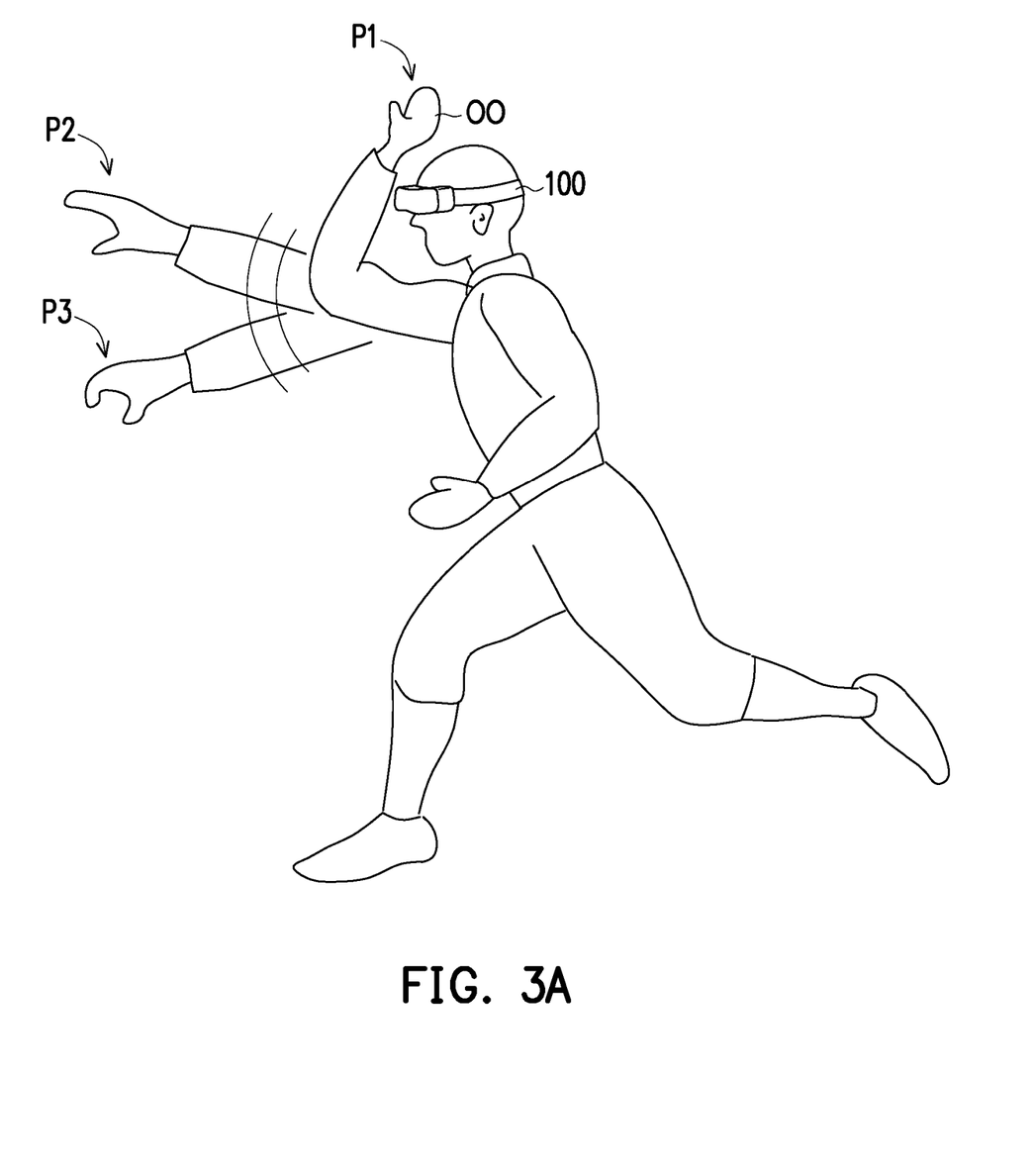
FIG. 3A is a schematic diagram illustrating a motion of an operating object in a real environment.

For example, FIG. 3A is a schematic diagram illustrating a motion of an operating object in a real environment. Referring to FIG. 3A, the virtual object operating system 100 is a head mounted display, and the operating object OO is a hand. It is assumed that a user performs a throwing motion, and the positions P1, P2 and P3 of the operating object OO would be different at different time points.

Figure 3B:
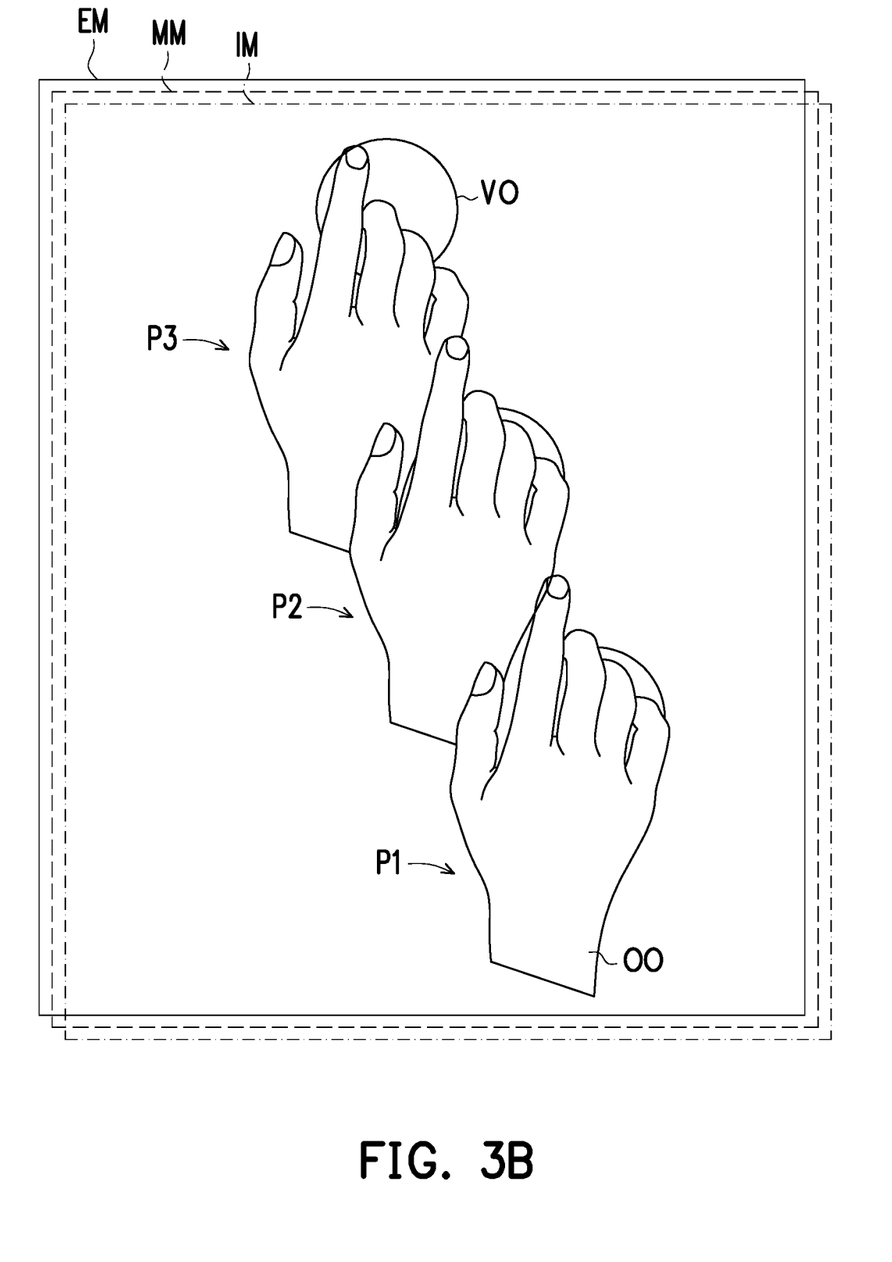
FIG. 3B is a schematic diagram illustrating a motion of a virtual object in a virtual environment.

FIG. 3B is a schematic diagram illustrating a motion of a virtual object in a virtual environment. Referring to FIG. 3B, the virtual object VO is a virtual baseball. The image capturing apparatus 110 disposed at the head mounted display captures toward the operating object. The processor 150 may display an image illustrating that a virtual hand corresponding to the operating object OO grasps the virtual object VO on the display 130. The schematic diagram shows three overlapped images IM, MM, and EM for easy understanding of the difference among the positions P1, P2 and P3 of the operating object OO.

Figure 4:
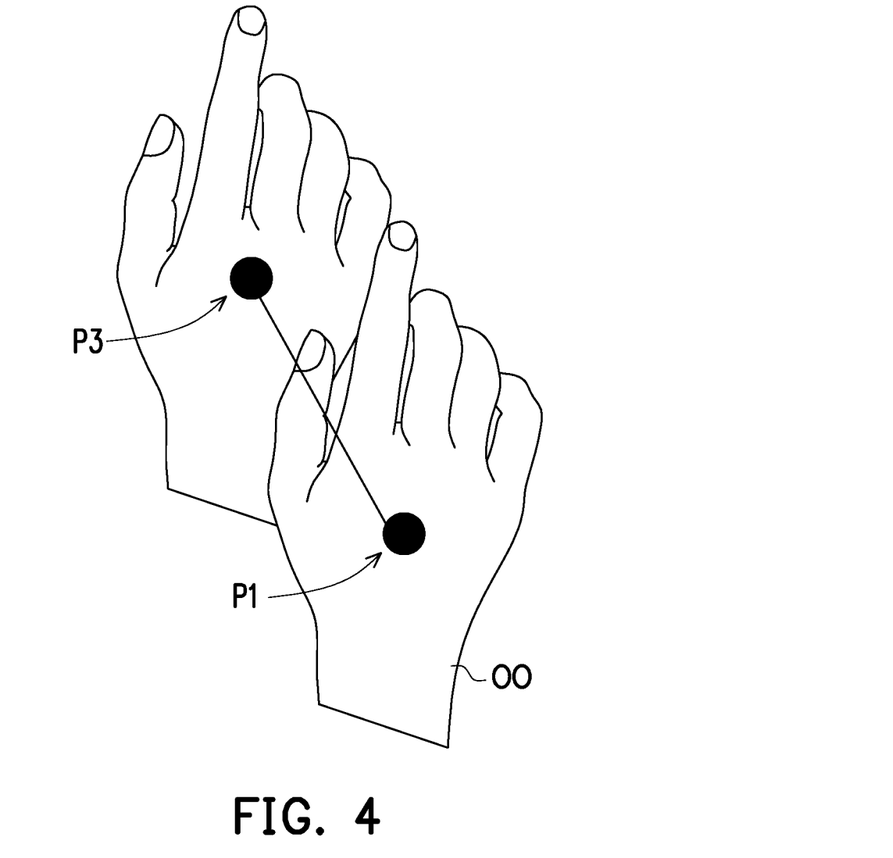
FIG. 4 is a schematic diagram illustrating a position difference in images.

FIG. 4 is a schematic diagram illustrating a position difference in images. Referring to FIG. 3B and FIG. 4, it is assumed that an initial image IM is corresponding to the position P1 of the operating object OO where the virtual baseball is held by the virtual hand, and an ending image EM is corresponding to the position P3 of the operating object OO where the virtual baseball is just leaving from the virtual hand. The central point of the virtual hand, which is a black dot in the drawing, would be a representative point of the operating object OO. The relative distance between the positions P3 and P1 is divided by the elapsed time between two captured time points of the positions P3 and P1, and the velocity of the operating object can be determined according to the calculated result.

In one embodiment, in addition to the starting image and the ending image, the processor 150 may further select a middle image among the images, and the middle image captures a middle state of an interacting situation between the operating object and the virtual object. The middle state is the state between the initial state and the final state. Then, the processor 150 may determine the motion of the operating object by comparing the starting image, the middle image, and the ending image.

In some embodiments, the processor 150 calculates a first elapsed time and a first position change of the operating object from the starting image to the middle image, and obtains a first velocity of the operating object according to the first elapsed time and the first position change of the operating object from the starting image to the middle image. In addition, the processor 150 calculates a second elapsed time and a second position change of the operating object from the middle image to the ending image, and obtains a second velocity of the operating object according to the second elapsed time and the second position change of the operating object from the middle image to the ending image. It should be noticed that the description of the position change, the elapsed time, and the velocity may refer to the aforementioned embodiments, and would be omitted. In this embodiment, the processor 150 further obtains an average acceleration of the operating object according to the first elapsed time, the second elapsed time, the first velocity and the second velocity of the operating object, and use the average acceleration of the operating object as a reference to determine the motion of the operating object. The average acceleration would be the calculated result that the sum of the first velocity and the second velocity is divided by the sum of the first elapsed time and the second elapsed time. The average acceleration of the operating object could be the reference for determining the force formed by the motion of the operating object.

For example, when the user pitches a baseball, the velocity of the hand may change. The middle image may be used to determine the movement trajectory of the hand. For another example, when the user wants to make a breaking ball, the way that the fingers roll the ball before the ball leaves from the fingers may change the ball's flight-path.

Taking FIG. 3B as an example, it is assumed that a middle image MM is corresponding to the position P2 of the operating object OO where virtual baseball is still held by the virtual hand. The first velocity of the operating object may be determined based on the first elapsed time and the first position change of the operating object between the initial image IM and the middle image MM. The second velocity of the operating object may be determined based on the second elapsed time and the second position change of the operating object between the middle image MM and the ending image EM. The velocity change between the first and the second velocities can be determined. In addition, the force applied by the operating object OO can be estimated according to the average acceleration based on the first and the second velocities.

In one embodiment, the processor 150 may obtain a position change route of the operating object according to the first position change and the second position change, and use the position change route of the operating object as a reference to determine the motion of the operating object.

For example, the position change route would be the trajectory formed by the first position change and the second position change.

In another embodiment, the processor 150 may further detect the motion of the operating object in the real environment by the motion sensor 120 on the operating object. The detected result may be acceleration, rotation, magnetic force, orientation or a combination thereof. Then, the processor 150 may use the motion detecting data of the operating object as a reference to determine the motion of the operating object. For example, the processor 150 corrects the motion of the operating object in the images according to the detected result of the motion sensor 120. The velocity of the operating object can be estimated through integral on the acceleration of the detected result. The velocities of the operating object respectively determined by capturing image analysis and the detected result of the motion sensor 120 may have a weight relation, and the processor 150 determines the final velocity of the operating object according to the weight relation.

Back to FIG. 2, after the motion of the operating object is determined, the processor 150 may determine the motion of the virtual object interacted with the operating object according to a determining factor (step S250). Specifically, on the basis of different interacting situations between the operating object and the virtual object, the motion of the virtual object may be different. The determining factor may include the motion of the operating object. For example, the motion of an operating object is a throwing motion, and a corresponding motion of a virtual object would be a fly motion. For another example, a motion of an operating object is a swing motion, and a corresponding motion of a virtual object would be a rotation motion. However, the velocity, acceleration, and/or position change route of the operating object affect the motion of the virtual object. In one embodiment, the faster the operating object moves, the faster the virtual object moves. On the other hand, the slower the operating object moves, the slower the virtual object moves. The velocity of the operating object and/or the force formed by the operating object may have a linear, an exponential relation, or other mathematical formula relations with the velocity of the virtual object. It should be noted that, the velocity and/or the force of the operating object may affect moving velocity or rotation velocity. In addition, the aforementioned interacting situation or motion can be displayed on the display 130.

In one embodiment, a virtual object is selected by a user in the virtual environment. When the user performs a first motion on the virtual object, the processor 150 may moves the virtual object backward to be away from the operating object or moves the virtual object forward to approach the operating object in the virtual environment. If the user performs a second motion having a velocity faster than the first motion, the virtual object would move faster. On the other hand, if the user performs a third motion having a velocity slower than the first motion, the virtual object would move slower. It should be noted that, the aforementioned first to third motions could be throwing, pushing, pulling, kicking, swinging, or other motions.

In one embodiment, the processor 150 may further obtain physical characteristics of the virtual object in the real environment, and modify the motion of the virtual object according to the physical characteristics of the virtual object. The determining factor further includes the physical characteristics. The physical characteristics may be mass, volume, shape, friction coefficient, etc. For example, the heavier the mass of a virtual object is, the slower the virtual object moves horizontally.

In one embodiment, the processor 150 scans a real object in the real environment through the image capturing apparatus 110 to generate a scanning result (such as the color, texture, and geometric shape of the real object), identifies the real object according to the scanning result to generate an identification result (such as the real object's name or identifier), creates the virtual object in the virtual environment corresponding to the real object in the real environment according to the scanning result, and determines the physical characteristics of the virtual object according to the identification result. It means that the virtual object has a corresponding real object in the real environment.

In another embodiment, the processor 150 may determine at least one interactive characteristic of the virtual object. The determining factor further includes the interactive characteristic. The interactive characteristic may be the manipulating point, a manipulating hand gesture, and/or a manipulating movement.

For example, the operating object is a hand, the processor 150 may further identify a gesture of the hand in the images in step S230, and modify the motion of the virtual object according to the gesture of the hand in step S250. For another example, different pitching grips may result in different trajectories, rotations, and speeds of a baseball while being thrown. One or more specific gestures may be defined with one or more specific velocity or rotation variations, and the processor 150 may modify the motion of the virtual object according to a corresponding velocity or rotation variation.

In one embodiment, the processor 150 may scan a real object in the real environment through the image capturing apparatus 110 to generate a scanning result (such as the color, texture, and geometric shape of the real object), identify the real object according to the scanning result to generate an identification result (such as the real object's name or identifier), create the virtual object in the virtual environment corresponding to the real object in the real environment according to the scanning result, and determine the interactive characteristic of the virtual object according to the identification result.

In still another embodiment, the processor 150 may further identify a least one manipulating point (i.e., contact point) on the virtual object contacted by the operating object in the virtual environment in step S230, and modify the motion of the virtual object according to the manipulating point of the operating object in step S250. In this embodiment, the determining factor includes at least one manipulating point when the manipulating point meets the predefined manipulating point. Each virtual object may be predefined with one or more predefined manipulating points on surface thereon. The processor 150 may track the motion of the operating object, and determine whether the operating object is contacted with the virtual object. In response to the operating object being contacted with the virtual object, the processor 150 determines whether the manipulating point meets at least one predefined manipulating point according to the interactive characteristic. The contacted operating point or the nearest operating point would be determined as the manipulating point. In addition, one or more specific manipulating points may be defined with one or more specific velocity, rotation variations, or force, and the processor 150 may modify the motion of the virtual object according to a corresponding velocity, rotation variation, or force.

In another embodiment, the determining factor includes the manipulating point, and the processor 150 identifies at least one manipulating point on the virtual object contacted by the operating object in the virtual environment. It means that all or almost all of the surface of the virtual object can be manipulated.

In still another embodiment, the determining factor includes at least one of the manipulating points, the acceleration of the operating object, the spin speed, and the spin rotation of the virtual object. The processor 150 may identify one or more manipulating points on the operating object contacted by the virtual object, and estimate at least one of spin speed and spin rotation of the virtual object. Regarding throwing the virtual object, the force applied by the operating object, the manipulating points/areas on the virtual object, environment factor (such as wind speed, wind direction, etc.) may affect the motion of the virtual object, such as spin speed, spin rotation, etc. For example, to make a breaking ball, a change of the grip way of the ball, the force applied by the hand, wind speed, and/or wind direction may result in different types of the breaking ball.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A virtual object operating method, comprising:
    obtaining a plurality of images, wherein the images are captured from a real environment;
    determining a motion of an operating object according to the plurality of images, wherein the operating object is existed in the plurality of images, and determining the motion of the operating object according to the plurality of images comprises:
        selecting a plurality of interacting images among the plurality of images, wherein the plurality of interacting images capture a plurality states of an interacting situation between the operating object and the virtual object; and
        determining the motion of the operating object by comparing the plurality of interacting images; and
    determining a motion of a virtual object interacted with the operating object according to a determining factor, wherein the virtual object is existed in a virtual environment,
    wherein the determining factor comprises the motion of the operating object.

2. The virtual object operating method according to claim 1, wherein the plurality of interacting images comprises a starting image and an ending image, and the step of determining the motion of the operating object according to the plurality of images comprises:
    selecting the starting image among the plurality of images, wherein the starting image captures an initial state of the interacting situation between the operating object and the virtual object;
    selecting the ending image among the plurality of images, wherein the ending image captures a final state of the interacting situation between the operating object and the virtual object; and
    determining the motion of the operating object by comparing the starting image and the ending image.

3. The virtual object operating method according to claim 2, wherein the step of determining the motion of the operating object by comparing the starting image and the ending image comprises:
    calculating an elapsed time and a position change of the operating object between the starting image and the ending image;
    obtaining an average velocity of the operating object according to the elapsed time and the position change of the operating object between the starting image and the ending image; and
    using the average velocity of the operating object as a reference to determine the motion of the operating object.

4. The virtual object operating method according to claim 1, wherein the plurality of interacting images comprises a starting image, a middle image, and an ending image, and the step of determining the motion of the operating object according to the plurality of images comprises:
    selecting the starting image among the plurality of images, wherein the starting image captures an initial state of the interacting situation between the operating object and the virtual object;
    selecting the middle image among the plurality of images, wherein the middle image captures a middle state of an interacting situation between the operating object and the virtual object;
    selecting the ending image among the plurality of images, wherein the ending image captures a final state of the interacting situation between the operating object and the virtual object; and
    determining the motion of the operating object by comparing the starting image, the middle image, and the ending image.

5. The virtual object operating method according to claim 4, wherein the step of determining the motion of the operating object by comparing the starting image, the middle image, and the ending image comprises:
    calculating a first elapsed time and a first position change of the operating object from the starting image to the middle image;
    obtaining a first velocity of the operating object according to the first elapsed time and the first position change of the operating object from the starting image to the middle image;
    calculating a second elapsed time and a second position change of the operating object from the middle image to the ending image;
    obtaining a second velocity of the operating object according to the second elapsed time and the second position change of the operating object from the middle image to the ending image;
    obtaining an average acceleration of the operating object according to the first elapsed time, the second elapsed time, the first velocity and the second velocity of the operating object; and
    using the average acceleration of the operating object as a reference to determine the motion of the operating object.

6. The virtual object operating method according to claim 4, wherein the step of determining the motion of the operating object by comparing the starting image, the middle image, and the ending image comprises:
    obtaining a position change route of the operating object according to the first position change and the second position change; and using the position change route of the operating object as a reference to determine the motion of the operating object.

7. The virtual object operating method according to claim 1, further comprising:
determining physical characteristics of the virtual object; and
wherein the determining factor further comprises the physical characteristics of the virtual object.

8. The virtual object operating method according to claim 7, further comprising:
scanning a real object in the real environment to generate a scanning result;
identifying the real object according to the scanning result to generate an identification result;
creating the virtual object in the virtual environment corresponding to the real object in the real environment according to the scanning result; and
determining the physical characteristics of the virtual object according to the identification result.

9. The virtual object operating method according to claim 1, further comprises:
determining at least one interactive characteristic of the virtual object,
wherein the determining factor further comprises the interactive characteristics of the virtual object.

10. The virtual object operating method according to claim 9, further comprising:
scanning a real object in the real environment to generate a scanning result;
identifying the real object according to the scanning result to generate an identification result;
creating the virtual object in the virtual environment corresponding to the real object in the real environment according to the scanning result; and
determining the at least one interactive characteristic of the virtual object according to the identification result.

11. The virtual object operating method according to claim 10, further comprising:
identifying at least one manipulating point on the virtual object contacted by the operating object in the virtual environment;
determining whether the at least one manipulating point meets at least one predefined manipulating point according to the at least one interactive characteristic, wherein the at least one interactive characteristic comprises the at least one predefined manipulating point, and
the determining factor comprises the at least one manipulating point when the at least one manipulating point meets the at least one predefined manipulating point.

12. The virtual object operating method according to claim 1, further comprising:
identifying at least one manipulating point on the virtual object contacted by the operating object in the virtual environment;
wherein the determining factor comprises the at least one manipulating point.

13. The virtual object operating method according to claim 1, further comprising:
identifying at least one manipulating point on the operating object contacted by the virtual object; and
estimating at least one of spin speed and spin rotation of the virtual object,
wherein the determining factor comprises at least one of the at least one manipulating point, acceleration of the operating object, the spin speed, and the spin rotation of the virtual object.

14. The object operating method according to claim 1, wherein the step of determining the motion of the operating object according to the plurality of images comprises:
obtaining motion detecting data of the operating object by a motion sensor on the operating object; and
using the motion detecting data of the operating object as a reference to determine the motion of the operating object.

15. A virtual object operating system, comprises:
an image capturing apparatus, obtaining a plurality of images from a real environment;
a processor, coupled to the image capturing apparatus, and configured for:
determining a motion of an operating object according to the plurality of images, wherein the operating object is existed in a real environment, and determining the motion of the operating object according to the plurality of images comprises:
selecting a plurality of interacting images among the plurality of images, wherein the plurality of interacting images capture a plurality states of an interacting situation between the operating object and the virtual object; and
determining the motion of the operating object by comparing the plurality of interacting images; and
determining a motion of a virtual object interacted with the operating object according to a determining factor, wherein the virtual object is existed in a virtual environment,
wherein the determining factor comprises the motion of the operating object.

16. The virtual object operating system according to claim 15, wherein the plurality of interacting images comprises a starting image and an ending image, and the processor is configured for:
selecting the starting image among the plurality of images, wherein the starting image captures an initial state of the interacting situation between the operating object and the virtual object;
selecting the ending image among the plurality of images, wherein the ending image captures a final state of the interacting situation between the operating object and the virtual object; and
determining the motion of the operating object by comparing the starting image and the ending image.

17. The virtual object operating system according to claim 16, wherein the processor is configured for:
calculating an elapsed time and a position change of the operating object between the starting image and the ending image;
obtaining an average velocity of the operating object according to the elapsed time and the position change of the operating object between the starting image and the ending image; and
using the average velocity of the operating object as a reference to determine the motion of the operating object.

18. The virtual object operating system according to claim 15, wherein the plurality of interacting images comprises a starting image, a middle image, and an ending image, and the processor is configured for:
selecting the starting image among the plurality of images, wherein the starting image captures an initial state of the interacting situation between the operating object and the virtual object;

selecting the middle image among the plurality of images, wherein the middle image captures a middle state of an interacting situation between the operating object and the virtual object;

selecting the ending image among the plurality of images, wherein the ending image captures a final state of the interacting situation between the operating object and the virtual object; and determining the motion of the operating object by comparing the starting image, the middle image, and the ending image.

19. The virtual object operating system according to claim 18, wherein the processor is configured for:

calculating a first elapsed time and a first position change of the operating object from the starting image to the middle image;

obtaining a first velocity of the operating object according to the first elapsed time and the first position change of the operating object from the starting image to the middle image;

calculating a second elapsed time and a second position change of the operating object from the middle image to the ending image;

obtaining a second velocity of the operating object according to the second elapsed time and the second position change of the operating object from the middle image to the ending image;

obtaining an average acceleration of the operating object according to the first elapsed time, the second elapsed time, the first velocity and the second velocity of the operating object; and using the average acceleration of the operating object as a reference to determine the motion of the operating object.

20. The virtual object operating system according to claim 18, wherein the processor is configured for:

obtaining a position change route of the operating object according to the first position change and the second position change; and using the position change route of the operating object as a reference to determine the motion of the operating object.

21. The virtual object operating system according to claim 15, wherein the processor is configured for:

determining physical characteristics of the virtual object; and wherein the determining factor further comprises the physical characteristics of the virtual object.

22. The virtual object operating system according to claim 21, wherein the processor is configured for:

scanning a real object in the real environment through the image capturing apparatus to generate a scanning result;

identifying the real object according to the scanning result to generate an identification result;

creating the virtual object in the virtual environment corresponding to the real object in the real environment according to the scanning result; and determining the physical characteristics of the virtual object according to the identification result.

23. The virtual object operating system according to claim 15, wherein the processor is configured for:

determining at least one interactive characteristic of the virtual object, wherein the determining factor further comprises the interactive characteristics of the virtual object.

24. The virtual object operating system according to claim 23, wherein the processor is configured for:

scanning a real object in the real environment to generate a scanning result;

identifying the real object according to the scanning result to generate an identification result;

creating the virtual object in the virtual environment corresponding to the real object in the real environment according to the scanning result; and determining the at least one interactive characteristic of the virtual object according to the identification result.

25. The virtual object operating system according to claim 24, wherein the processor is configured for:

identifying at least one manipulating point on the virtual object contacted by the operating object in the virtual environment;

determining whether the at least one manipulating point meets at least one predefined manipulating point according to the at least one interactive characteristic, wherein the at least one interactive characteristic comprises the at least one predefined manipulating point, and the determining factor comprises the at least one manipulating point when the at least one manipulating point meets the at least one predefined manipulating point.

26. The virtual object operating system according to claim 15, wherein the processor is configured for:

identifying at least one manipulating point on the virtual object contacted by the operating object in the virtual environment;

wherein the determining factor comprises the at least one manipulating point.

27. The virtual object operating system according to claim 15, wherein the processor is configured for:

identifying at least one manipulating point on the operating object contacted by the virtual object; and estimating at least one of spin speed and spin rotation of the virtual object, wherein the determining factor comprises at least one of the at least one manipulating point, acceleration of the operating object, the spin speed, and the spin rotation of the virtual object.

28. The virtual object operating system according to claim 15, wherein the processor is configured for:

obtaining motion detecting data of the operating object by a motion sensor on the operating object; and using the motion detecting data of the operating object as a reference to determine the motion of the operating object.

* * * * *